May 5, 1959 G. W. FEIL, JR 2,885,243
VEHICLE CAB MOUNTING EMPLOYING PIVOTED LEAF SPRING
Original Filed Sept. 29, 1951 2 Sheets-Sheet 2
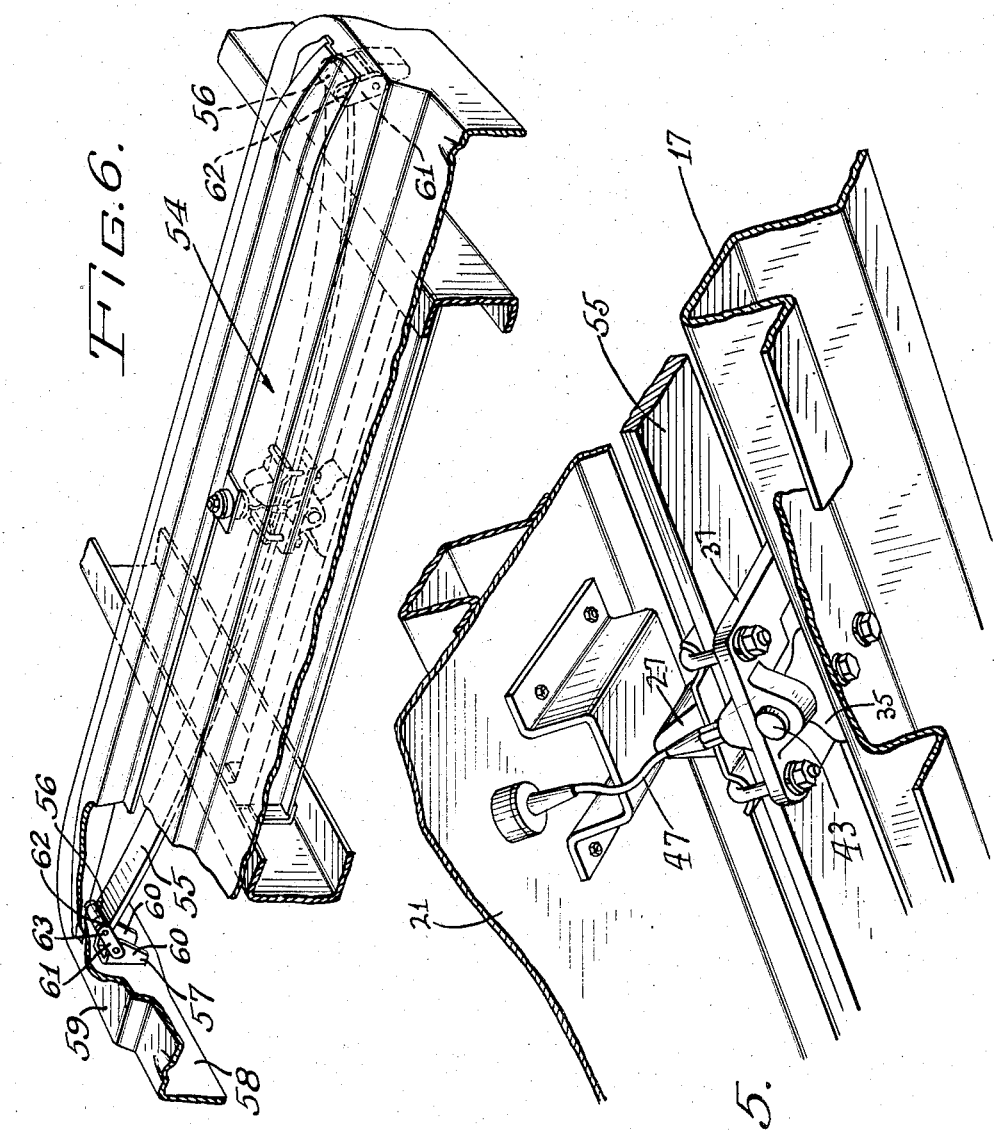
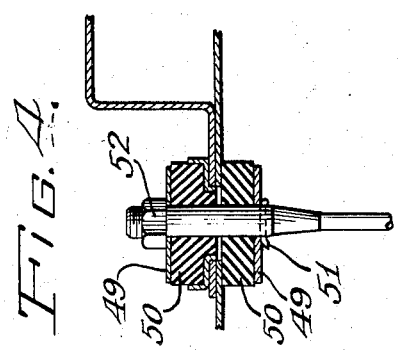
Inventor:
George W. Feil Jr.

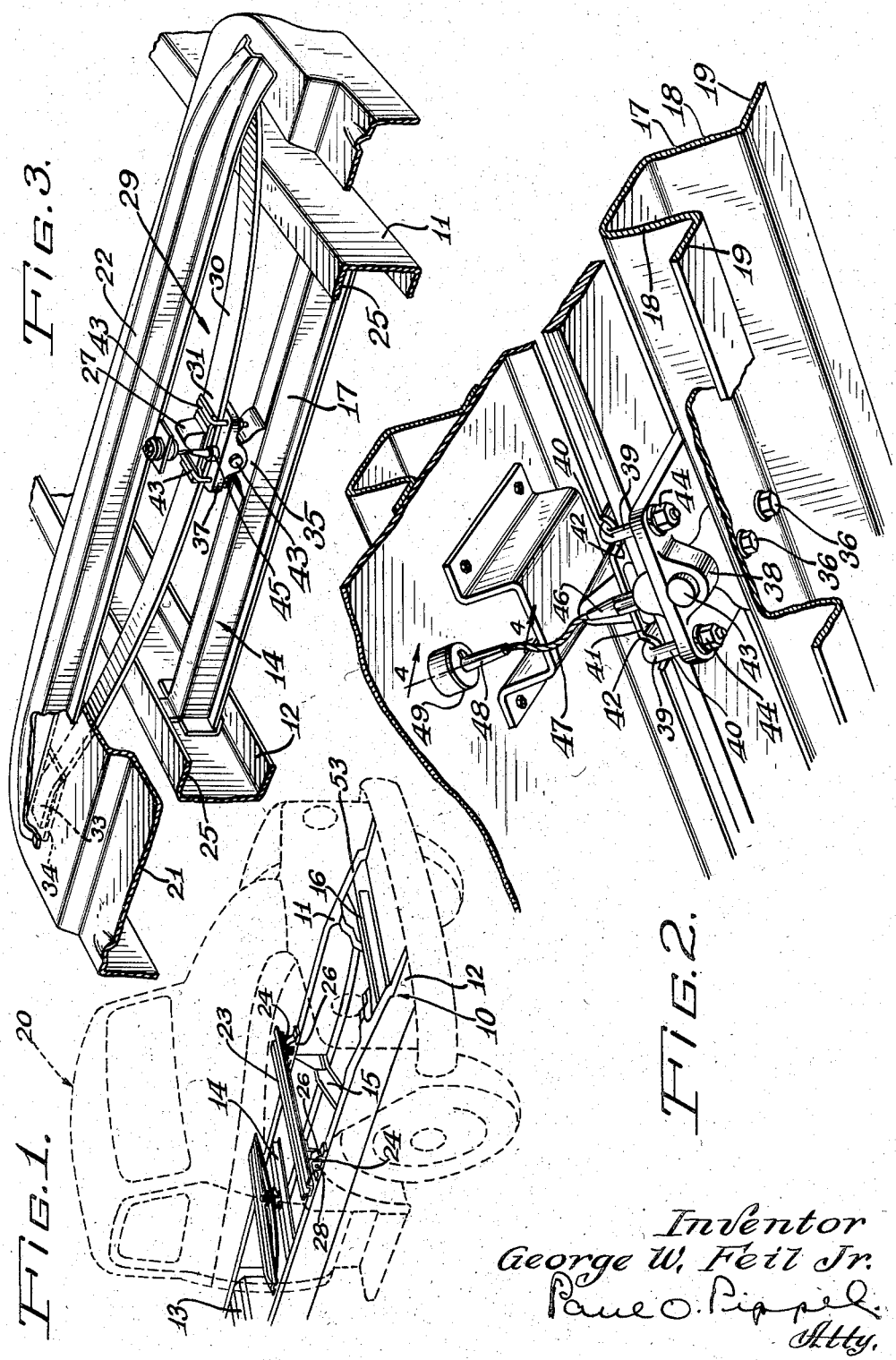

United States Patent Office

2,885,243
Patented May 5, 1959

2,885,243

VEHICLE CAB MOUNTING EMPLOYING PIVOTED LEAF SPRING

George W. Feil, Jr., Fort Wayne, Ind., assignor to International Harvester Company, a corporation of New Jersey Original application September 29, 1951, Serial No. 248,927, now Patent No. 2,754,146, dated July 10, 1956. Divided and this application January 30, 1956, Serial No. 562,200

3 Claims. (Cl. 296—35)

This invention relates to the mounting of a body upon a chassis frame of a motor vehicle and more particularly to the novel connections, supports and the disposition of the same interposed between a vehicle body and chassis frame. The present invention is a division of patent application Serial No. 248,927, filed September 29, 1951, now Patent No. 2,754,146, entitled Cab Mounting Employing Leaf Springs.

In the operation of a motor vehicle such as a motor truck over a comparatively smooth road bed at a particular critical speed it has been found that the vehicle body is caused to vibrate violently. The vibrations in many cases are great enough to break the connections between the vehicle chassis frame and the body, and also are a source of discomfort for those riding in the body.

It is fairly well established that the cause of the vibrations is due primarily to the exciting force generated by the unbalanced condition or run-out of the ground-engaging wheels. In the case of a motor truck, leaf springs are generally interposed between the truck axles and the chassis frame to absorb the exciting force and if ideal springs having no static friction whatsoever were available, the vibrations would not occur. However, conventional leaf springs do have a certain amount of static friction and if the exciting force from the ground-engaging wheels is less than the static friction of the leaf springs, the chassis frame and axles will act as though they were connected by a rigid link. Consequently, the amplitude of vibration of the chassis frame will equal the amplitude of the wheels until the exciting force becomes greater than the frictional force.

It has also been determined that upon reaching a certain vehicle speed, a periodic exciting force is transmitted from the wheels to the chassis frame through the leaf springs, causing the frame to resonate in bending. Furthermore, since in the construction of conventional motor trucks the engine and operator's cab are spaced forwardly of and are secured independently of the load carrying body and the payload carried thereby which tend to stiffen the rear end of the chassis frame, the disturbance caused by the bending vibration is most pronounced in the vicinity of the rear panel of the operator's cab. It is, therefore, the primary objective of the present invention to provide means for mitigating the damaging effect of the chassis frame vibrations on the vehicle cab by substantially preventing the transmission of the vibratory forces to the rear portion of the vehicle cab.

Another objective is to provide a vehicle body mounting structure by virtue of which the torsional forces imposed on a relatively flexible chassis frame by the distortion of the frame side sills as when the vehicle is driven over an uneven terrain or road bed irregularities, causing one or more ground-engaging wheels to be elevated differently than the other wheels, are effectively relieved and are transmitted to a lesser degree to the cab than heretofore possible.

A further object is the provision of a three-point mounting structure for vehicle cabs which employ a transversely disposed leaf spring for connecting one end of the body to the chassis frame.

A still further object is to provide a single leaf spring for interconnecting the rear portion of the vehicle cab and the chassis frame to absorb and cushion the shocks and vibrations normally transmitted to the cab at that point.

The foregoing and other important objects and desirable features inherent in and encompassed by the invention, together with many of the purposes and uses thereof, will become readily apparent from a reading of the ensuing description in conjunction with the annexed drawings, in which:

Figure 1 is a perspective view of the front end of a motor truck chassis taken from a point disposed angularly above the vehicle; the outline of the vehicle cab is shown with broken lines;

Figure 2 is an enlarged perspective view partially in cross section looking rearwardly of the vehicle from a point disposed angularly above the right side sill member showing one form of the invention;

Figure 3 is a perspective view of the form of invention illustrated in Figure 2 showing a cab mounting structure for supporting the rearwardly disposed end of the cab on the chassis frame;

Figure 4 is a sectional view taken substantially along line 4—4 of Figure 2;

Figure 5 is a view similar to Figure 2 showing a second form of the invention; and Figure 6 is a perspective view similar to Figure 3 illustrating the second form of the invention.

Referring to the drawings, wherein like reference characters designate like elements throughout the various views, there is shown the forward portion of a conventional truck chassis frame 10. The chassis frame 10 includes a pair of longitudinally extending transversely spaced side sill members 11 and 12 having the usual U-shaped form interconnected by a plurality of longitudinally spaced, transversely disposed cross members 13, 14, 15 and 16. Cross member 14, as best shown in Figures 2 and 3, has an inverted U-shaped section 17, the legs 18 of which are provided with oppositely projecting flanges 19.

The vehicle cab 20, the sheet metal outline of which is shown somewhat diagrammatically with broken lines in Figure 1, includes a floor panel 21 and a rearward cab cross member 22 longitudinally spaced from a forward cab cross member 23. The forward cab cross member 23 has secured thereto adjacent each end thereof a pair of depending brackets 24. Rigidly fastened to the top flanges 25 of each sill member 11 and 12 are bracket members 26 which are provided with horizontal, transversely extending bearing portions. A bolt 28 or other suitable journal means extends through each bearing portion and is fastened to a respective bracket 24 to pivotally connect the forward end of the vehicle cab 20 to the chassis frame 10. A rubber bushing is interposed between the bolt 28 and the bearing portion whereby the bolt 28 is capable of rotating and moving angularly slightly with respect to the bearing portion by deformation of the rubber bushing.

The rearward end of the vehicle cab 20 is resiliently connected to the chassis frame 10 by means of a leaf spring structure, designated generally by numeral 29. As best shown in Figures 2 and 3, the leaf spring structure 29 includes a single arched leaf spring member 30 having its central portion 31 pivotally connected to the upper surface of the cross member 14 substantially midway between the side sill members 11 and 12, whereby the leaf spring structure 29 is capable of pivoting along a substantially horizontal axis spaced midway between the side sill members. The ends 33 of the leaf spring member 30 are slightly flattened, as shown in Figure 3, and are disposed above and outwardly of the side sill members 11 and 12. The flattened ends 33 are adapted to slidingly engage wear plates 34 secured to the under side of the floor panel 21. It will be noted that the wear plates 34 are substantially in vertical alignment with the ends of the rear cab cross member 22 as shown in Figure 3. A pedestal bearing block 35 is rigidly fastened to the mid portion of the cross member 14 by means of bolts 36. A bracket member 37 having spaced depending legs 38 is clamped to the under side of the leaf spring member 30 by means of a pair of U-bolts 39, the legs 40 of which extend through apertures in the bracket member 37. A seat member 41 mounted on the upper side of the central portion 31 has spaced channels 42 formed therein for receiving the bight sections 43 of the U-bolts 39. Locking nuts 44 are used to tightly clamp the leaf spring member 30 to the bracket member 37. The legs 38 embrace the bearing block 35 and carry a pivot pin 43 which extends through the bearing block 35.

It will be evident from the above described structure that the rear end of the cab 20 is capable of moving relatively in a vertical direction with respect to the chassis frame 10 by pivoting about a transversely extending axis passing through the bolts or pivot pins 28. Furthermore, the leaf spring member 30 is comparatively "soft" to isolate the cab 20 from the chassis frame 10 and to prevent the transmission of vibrations from the chassis frame to the cab. However, supporting the rear end of the cab as described above may allow more relative movement under certain operating conditons than is desired. Hence, to compensate for this eventuality, resilient stop means are provided to positively limit the relative movement. Excessive relative movement in a downward direction is prevented by means of an upwardly projecting pad 27 of resilient cushioning material such as rubber or the like which is clamped to the central portion 31 of the leaf spring member 30 by seat member 41 coming in contact with a U-shaped abutment member fastened to and depending from the floor panel 21.

In order to limit vertical movement of the rear end of the cab 20 away from the chassis frame 10, the bracket member 37 is provided with a vertical boss 45 having a threaded recess for receiving one end 46 of a braided cable 47. The opposite end 48 of the cable 47 is also threaded and extends through the floor panel 21 as well as a pair of clamping plates 49 disposed above and below the floor panel 21. Interposed between each plate 49 and the floor panel 21 is a rubber pad 50. The lower clamping plate 49 is held in position on the threaded portion 48 by a snap ring 51, as best shown in Figure 4. A lock nut 52 engages the threaded portion 48 to secure the cable end to the floor panel 21. It will be obvious that upward movement of the rear end of the cab 20 is effectively limited by the cable structure described above.

In normal operation of the truck over a comparatively level and smooth road bed, the chassis frame twist is practically non-existent. The entire weight of the vehicle cab 20 is supported by the bracket members 26 and the leaf spring structure 29 and the cab is maintained in a relatively fixed upright position with respect to the chassis frame 10. Inherently the corners of the vehicle cab 20 are the strongest and most rigid points and are the places where the cab structure can best resist vertical forces without distorting the cab structure excessively. Hence, by connecting the corners of the cab structure 20 to the chassis frame 10, as pointed out above, the need for extensive and heavy cab reinforcement members is eliminated. The force transmitted from the chassis frame 10 to the vehicle cab 20 by the spring structure 29 is distributed over the areas adjacent the corners of the cab structure which, as shown in Figure 3, are disposed directly below the ends of the cab cross member 22. Thus the tendency of the rear cab cross member 22 to bend and distort upon the application thereof of a force is less than if the upwardly directed force of the chassis frame 10 was transmitted to a small single area located substantially midway between the ends of the cab cross member 22 as in the majority of prior three-point cab mounting structures. It will be appreciated, therefore, that the cab cross members 22 and 23 can be made of much lighter material to result in a lighter weight vehicle cab 20. Possible damage to and breakage of the sheet metal cab 20 caused by the chassis frame 10 vibrating in resonance is reduced to a minimum. The leaf spring structure 29 which substantially prevents the transmission of the vibratory forces to the cab 20 from the chassis frame 10 by flexing is intentionally positioned at a point along the chassis frame where the vibration amplitude is the greatest.

Operation of the motor truck over an uneven terrain oftentimes results in the twisting of the chassis frame 10 whereby one end of the side sill members 11 or 12 is raised with respect to the other side sill member. The cab mounting structure described above effectively accommodates the chassis frame twist without imposing severe damaging strains on the sheet metal parts of the vehicle cab 20. As an example, if the forward end indicated by numeral 53 of the side sill member 11 is suddenly displaced vertically upwardly with respect to the side sill member 12, the resulting force is not fully transmitted to the vehicle cab 20 to tortionally distort the same. Bracket member 26 attached to sill member 11 and bracket 24 pivotally connected to bracket member 26 are raised a proportionately smaller distance by the displacement of the forward end 53 of the sill member 11 since they are spaced rearwardly of the forward end. The cab 20 will tend to pivot about the oppositely disposed bracket member 26 mounted on side sill member 12. The twist of the cab with respect to the chassis frame 10 is also accommodated by pivotal movement of the leaf spring assembly 29 with respect to the chassis frame 10 about a longitudinally extending axis containing the pivot pin 43. The pivotal movement of the cab 20 with respect to the chassis frame 10 about the transversely extending axis passing through the bracket member 26 mounted on the side sill member 12 is resiliently resisted by the leaf spring structure 29. The damaging forces of vibrations are effectively dissipated by the leaf spring structure 29 and the entire cab mounting structure described above affords greater flexibility between the cab structure 20 and the chassis frame 10 than was heretofore possible.

The second modification of the invention, illustrated in Figures 5 and 6, differs from the invention described above solely in the manner in which the leaf spring structure 54 is attached to the vehicle cab 20. It will be noted that the ends of the leaf spring member 55 are rolled over to form bearing portions 56. A U-shaped bracket member 57 is attached to the depending flange 58 of the floor panel 59 adjacent each end of the leaf spring member 55. The legs 60 of the bracket members 57 project inwardly and have pivotally attached thereto a pair of links 61. The opposite ends 62 of the links 61 are pivotally connected to a respective bearing portion 56 by means of pins 63. By fastening the leaf spring member 55 to the vehicle cab 20 in the manner described above the possibility of lateral movement of the rear end of the vehicle cab with respect to the chassis frame 10 is eliminated.

The embodiments of the invention chosen for the purposes of illustration and description herein are those preferred for achieving the objects of the invention and developing the utility thereof in the most desirable manner, due regard being had to existing factors of economy, simplicity of design and construction, and improvements sought to be effected. It will be appreciated, therefore, that the particular structural and functional aspects emphasized herein are not intended to exclude but rather to suggest such other adaptations and modifications of the invention as fall within the spirit and scope of the invention as defined in the appended claims.

What is claimed is:

1. In a motor vehicle having a longitudinal frame including a pair of side sill members interconnected by a transverse cross member and a body disposed above said frame, said body including a transverse cross member, the combination including said frame and body comprising: means for pivotally connecting each side sill member to one end of said body whereby said body is capable of rocking with respect to said frame about a substantially horizontal transversely extending axis fixed with respect to said frame; resilient means for connecting the opposite end of said body to said frame including a transversely disposed leaf spring having a central section thereof pivotally connected to a central portion of said frame cross member whereby said leaf spring is capable of rocking about a longitudinally extending axis disposed in a vertical plane passing through the longitudinal median line of said frame, and link means interconnecting the ends of said leaf spring and respective opposite sides of said body and being in vertical alignment with respective opposite ends of said body cross member; stop means for limiting relative rocking movement of said body toward said frame about said transversely extending axis in one direction including a rubber pad carried by said frame cross member and spaced between said frame cross member and said body; and second stop means for limiting the relative rocking movement of said body with respect to said frame about said transversely extending axis in the opposite direction including a cable having its ends connected respectively to said body and said frame cross member, said pad and the point where said cable is connected to said frame cross member being disposed in a vertical plane passing through the longitudinal median line of said frame.

2. In a motor vehicle having a longitudinal frame including a pair of side sill members interconnected by a transverse cross member and a body disposed above said frame, said body including a transverse cross member, the combination including said frame and body comprising: means for pivotally connecting each side sill member to one end of said body whereby said body is capable of rocking with respect to said frame about a substantially horizontal transversely extending axis fixed with respect to said frame; resilient means for connecting the opposite end of said body to said frame including a transversely disposed leaf spring having its ends abutting the under side of respective opposite sides of said body and being in vertical alignment with respective opposite ends of said body cross member, a central section of said leaf spring being pivotally connected to said central portion of said frame cross member whereby said leaf spring is capable of rocking with respect to said frame about a longitudinally extending axis spaced substantially midway between said side sill members; stop means for limiting rocking movement of said body with respect to said frame in one direction about said transversely extending axis including a rubber pad carried by said frame cross member and spaced between said frame cross member and said body; and second stop means for limiting the rocking movement of said body with respect to said frame about said transversely extending axis in the opposite direction including a cable having its ends connected respectively to said body and said frame cross member, said pad and point where said cable is connected to said frame cross member being disposed in a vertical plane passing through the longitudinal median line of said frame.

3. In a motor vehicle having a longitudinal frame including a pair of side sill members interconnected by a transverse cross member and a body disposed above said frame, said body including a transverse cross member, the combination including said frame and body comprising; means for pivotally connecting each side sill member to one end of said body whereby said body is capable of rocking with respect to said frame about a substantially horizontal transversely extending axis fixed with respect to said frame; resilient means for connecting the opposite end of said body to said frame including a transversely disposed leaf spring having a central section thereof pivotally connected to a central portion of said frame cross member whereby said leaf spring is capable of rocking about a longitudinally extending axis disposed in a vertical plane passing through the longitudinal median line of said frame, said leaf spring having its ends operatively connected to respective opposite ends of said body cross member; stop means for limiting relative rocking movement of said body toward said frame about said transversely extending axis in one direction including a rubber pad carried by said frame cross member and spaced between said frame cross member and said body; and second stop means for limiting the relative rocking movement of said body with respect to said frame about said transversely extending axis in the opposite direction including a cable having its ends connected respectively to said body and said frame cross member, said pad and the point where said cable is connected to said frame cross member being disposed in a vertical plane passing through the longitudinal median line of said frame.

References Cited in the file of this patent

UNITED STATES PATENTS

| 320,860 | Esch | June 23, 1885 |
| 914,111 | Buckwalter | Mar. 2, 1909 |
| 962,259 | Rockwell | June 21, 1910 |
| 1,062,872 | Abbot | May 27, 1913 |
| 1,288,757 | Timm | Dec. 24, 1918 |
| 1,647,084 | Curtis | Oct. 25, 1927 |
| 1,939,155 | Wise | Dec. 12, 1933 |
| 2,138,114 | Nelson | Nov. 29, 1938 |
| 2,301,742 | Muller | Nov. 10, 1942 |
| 2,485,794 | Waterbury et al. | Oct. 25, 1949 |